United States Patent [19]

Starkweather et al.

[11] B 3,922,485

[45] Nov. 25, 1975

[54] FLYING SPOT SCANNER WITH SCAN DETECTION

[75] Inventors: Gary K. Starkweather, Saratoga; Robert P. Kowalski, Campbell, both of Calif.

[73] Assignee: Xerox Corporation, Stamford, Conn.

[22] Filed: Nov. 27, 1972

[21] Appl. No.: 309,860

[44] Published under the Trial Voluntary Protest Program on January 28, 1975 as document no. B 309,860.

[52] U.S. Cl. .................... 178/7.6; 350/7

[51] Int. Cl.² .................... HO4N 1/22

[58] Field of Search .............. 178/7.6, 7.7; 350/6, 7, 350/285

[56] References Cited

UNITED STATES PATENTS

| | | | |
|---|---|---|---|
| 3,111,556 | 11/1963 | Knoll et al. | 178/7.7 |
| 3,574,469 | 4/1971 | Emerson | 356/200 |
| 3,646,568 | 2/1972 | Woywood | 346/108 |

OTHER PUBLICATIONS

Brown et al., "Otpical Deflector for Nonimpact Printing," p. 643, IBM Technical Disclosure Bulletin, Vol. 13, No. 3, Aug. 1970.

Latta, "Laser Raster Scanning," pp. 3879–3880, IBM Technical Disclosure Bulletin, Vol. 13, No. 12, May 1971.

*Primary Examiner*—Robert L. Griffin
*Assistant Examiner*—Michael A. Masinick
*Attorney, Agent, or Firm*—James J. Ralabate; Terry J. Anderson; Irving Keschner

[57] ABSTRACT

A flying spot scanning system is provided by utilizing reflected light from a multifaceted rotating polygon which is then directed to the scanned medium. A light source illuminates given facets of the polygon to provide the desired function of spot scanning. In each scanning cycle, information is transmitted to the scanned medium by modulating the light from the light source in accordance with a video signal. To assure an effective sequence of spot scans and the resulting scanning cycle, a beam splitter is employed to provide an unmodulated light beam from the original light beam which is directed at the illuminated facets of the polygon at an angle of incidence different from that of the incident modulated beam. An optically sensitive detector is aligned in relation to the scan width of the scanned medium so as to receive only the unmodulated beam during each scan cycle to determine the start/stop of each scan.

18 Claims, 4 Drawing Figures

FLYING SPOT SCANNER WITH SCAN DETECTION

BACKGROUND OF THE INVENTION

This invention relates to a flying spot scanning system for communicating video information to a scanned medium, and more particularly to a scanning system which utilizes a multifaceted rotating polygon for controlling the scanning cycles.

Much attention has been given to various optical approaches in flying spot scanning for the purpose of imparting the information content of a modulated light beam to a scanned medium. Galvanometer arrangements have been used to scan the light across a document for recording its information content thereon. Such arrangements have included planar reflecting mirrors which are driven in an oscillatory fashion. Other approaches have made use of multifaceted mirrors which are driven continuously. Various efforts have been made to define the spot size in order to provide for an optimum utilization of the scanning system.

In copending U.S. application Ser. No. 309,859, filed on Nov. 27, 1972 and assigned to the assignee of the present invention, a flying spot scanning system is provided which does not have constraints imposed upon the spot size and other relationships of optical elements within the system which are not alwawys desirable. As taught therein, a finite conjugate imaging system may be in convolution with the light beam and the rotating polygon. A doublet lens, in series with a convex imaging lens between the light source and the medium provides such an arrangement. The scan is synchronized so that a signal representative of the scan rate can be used to obtain the original video signal. To provide the signal for the necessary synchronization of moving elements within the system a suitable scan start/stop detection arrangement must interact with the scanning system.

It is thus an object of the present invention to provide a flying spot scanning system which include scan start/-stop detection apparatus for providing a synchronized system.

It is a further object of the present invention to provide a spot scanning system which utilizes a multificated rotating polygon for controlling scanning cycles.

It is yet another object of the present invention to provide a spot scanning system which provides an effective uniform spot size at the contact loci of the spot with the scanned medium.

It is still another object of the present invention to provide a spot scanning system which assures an improved sequence of scanning cycles.

Other objects of the invention will be evident from the description hereinafter presented.

SUMMARY OF THE INVENTION

The invention provides a flying spot scanning system which employs a multifaceted rotating polygon as the element for directing a beam of light to focus to a spot upon a medium and for enabling the spot to traverse the medium throughout a scan width. A light source, such as a laser, generates a beam of light substantially orthogonal to the facets of the polygons which illuminated facets in turn reflect the impinging light beam toward the medium in successive scanning cycles. Additional optical elementns are provided in convolution with the light source and the polygon to provide a desirable depth of focus of the spot and a sufficient resolution of the optical system.

Another feature of the invention is that a very large depth of focus is provided for the spot at the contact loci at the surface of the scanned medium. This feature is provided by utilizing a finite conjugate imaging system in convolution with the light beam and the rotating polygon. A doublet lens, in series with a convex imaging lens between the light source and the medium may provide such an arrangement. The doublet lens enables the original light beam to be sufficiently expanded for illuminating multiple contiguous facets of the polygon, whereas the imaging lens converges the expanded beam to focus at the contact loci on the surface of the scanned medium. Employing such an optical system assures a uniform spot size at the scanned medium even though a substantial scan width is traversed by the spot.

Still another feature of the invention is the modulation of the original beam by means of a video signal. The information content within the video signal is thereby imparted to the light beam itself. The medium to be scanned is one which is responsive to the modulated beam and records its information content as contained within the scanning spot in a usable form on its surface across the scan width.

Yet another feature of the invention includes an embodiment of the flying spot scanning system for utilization in high speed xerography. The scanned medium in such an embodiment would consist of a xerographic drum which rotates consecutively through a charging station, an exposure station where the spot traverses the scan width of the drum, through a developing station, and a transfer station where a web of copy paper is passed in contact with the drum and receives an electrostatic discharge to induce the transfer of the developed image from the drum to the copy paper. A fusing device then fixes the images to the copy paper as it passes to an output station.

Another feature of the invention is to provide a beam splitter for directing an unmodulated beam from the original light beam which is directed to at least one of the illuminated facets of the polygon at an angle of incidence different from that of the incident modulated beam. An optically sensitive detector is aligned in relation to the scan width on the scanned medium so as to receive only the unmodulated beam during each scan cycle to determine the start-stop of each scan. This information is used to synchronize the transmission of information with the scan cycles.

Also, another feature of the invention is that the rotational velocity of the polygon is synchronized in a predetermined relation to the scan rate used to obtain the video signal.

These and other features which are considered to be characteristic of this invention are set forth with particularity in the appended claims. The invention itself, however, as well as additional objects and advantages thereof, will best be understood in the following description when considered in conjunction with the accompanying drawings.

DESCRIPTION OF THE PREFERRED EMBODIMENT

Figure 1:
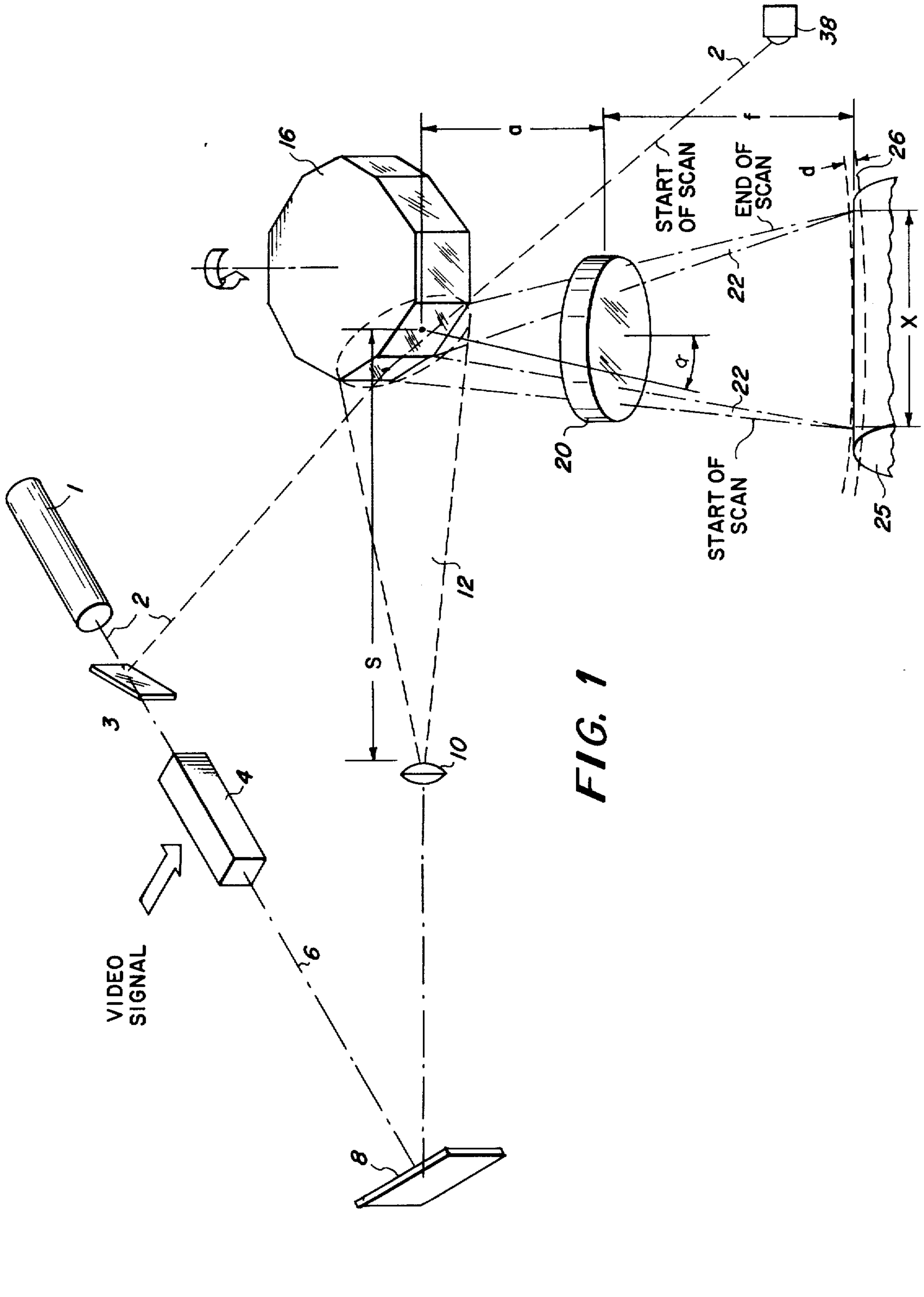
Fig. 1 is an isometric illustration of a flying spot scanning system in accordance with the invention.

In FIG. 1, an embodiment of a flying spot scanning in accordance with the invention is shown. A light source 1 provides the original light beam for utilization by the scanning system. The light source 1 is preferably a laser which generates a collimated beam 2 of monochromatic light one portion of which passes through beam splitter 3 to modulator 4 to modulate beam 2 in conformance with the information contained in a video signal.

Modulator 4 may be any suitable electro-optical modulator for recording the video information in the form of a modulated light beam 6 at the output of the modulator 4. The modulator 4 may be, for example, a Pockel's cell comprising a potassium dihydrogen phosphate crystal, whose index of refraction is periodically varied by the application of the varying voltage which represents the video signal. The video signal may contain information either by means of binary pulse code modulation or wide-band frequency code modulation. In any event, by means of the modulator 4 the information within the video signal is represented by the modulated light beam 6.

The light beam 6 is reflected from mirror 8 in convolution with a lens 10. The lens 10 may be any lens, preferably of two elements, which elements are in spaced relation to each other such that the external curved surfaces are provided in symmetry with the internal surfaces. Preferably the internal surfaces of lens 10 are cemented together to form a common contact zone. Of course, as is often the case in the embodiment of such a lens as a microscope objective, the elements may be fluid spaced. The lens 10 is required to image either a virtual or real axial point of beam 6 through a focal point, for example, on the opposite side of lens 10 for a real image. At the focal point, beam 6 diverges or expands to form beam 12 which impinges upon at least two contiguous facets of a scanning polygon 16.

In the preferred embodiment, the rotational axis of polygon 16 is orthogonal to the plane in which light beams 6 travels. The facets of the polygon 16 are mirrored surfaces for the reflection of any illuminating light impinging upon them. With the rotation of the polygon 16, a pair of light beams are reflected from the respective illuminated facets and turned through a scan angle for flying spot scanning. Alternatively, flying spot scanning could be provided by any other suitable device, such as mirrored piezoelectric crystals or planar reflecting mirrors which are driven in an oscillatory fashion.

In all of these arrangements, however, the reflecting surfaces would be at a distance S from the originating focal point of light beam 12 and in orthogonal relation to the plane bounded by the beam 6 such that the reflected beams would be in substantially the same plane as beam 6.

At a distance *a* from the leading illuminated facet of polygon 16 is positioned an imaging lens 20. Lens 20 is of a diameter D to cooperate with the respective reflected light beams throughout each scan of $2\alpha$ to render convergent beams 22 which define a focal plane 24 at a distance *f* from the imaging lens 20. In this preferred embodiment, imaging lens 20 is a five element compound lens as disclosed in U.S. applicataion Ser. No. 130,134 which was filed on Apr. 1, 1971 and assigned to the assignee of the present invention. The focal plane 24 is proximate a recording medium 25 whose surface 26 is brought in contact with the respective focal spots of the convergent light beams throughout a scan width *x*.

A substantially uniform spot size is assured throughout the scan width *x* even though a curved focal plane 24 is defined throughout the scanning cycle. The lens 10 in convolution with the imaging lens 20 provides a finite conjugate imaging system which allows a large depth of focus *d* which is coextensive with the contact loci of a spot throughout the scan width *x* on the surfaced 26 of the medium 25.

Figure 2:
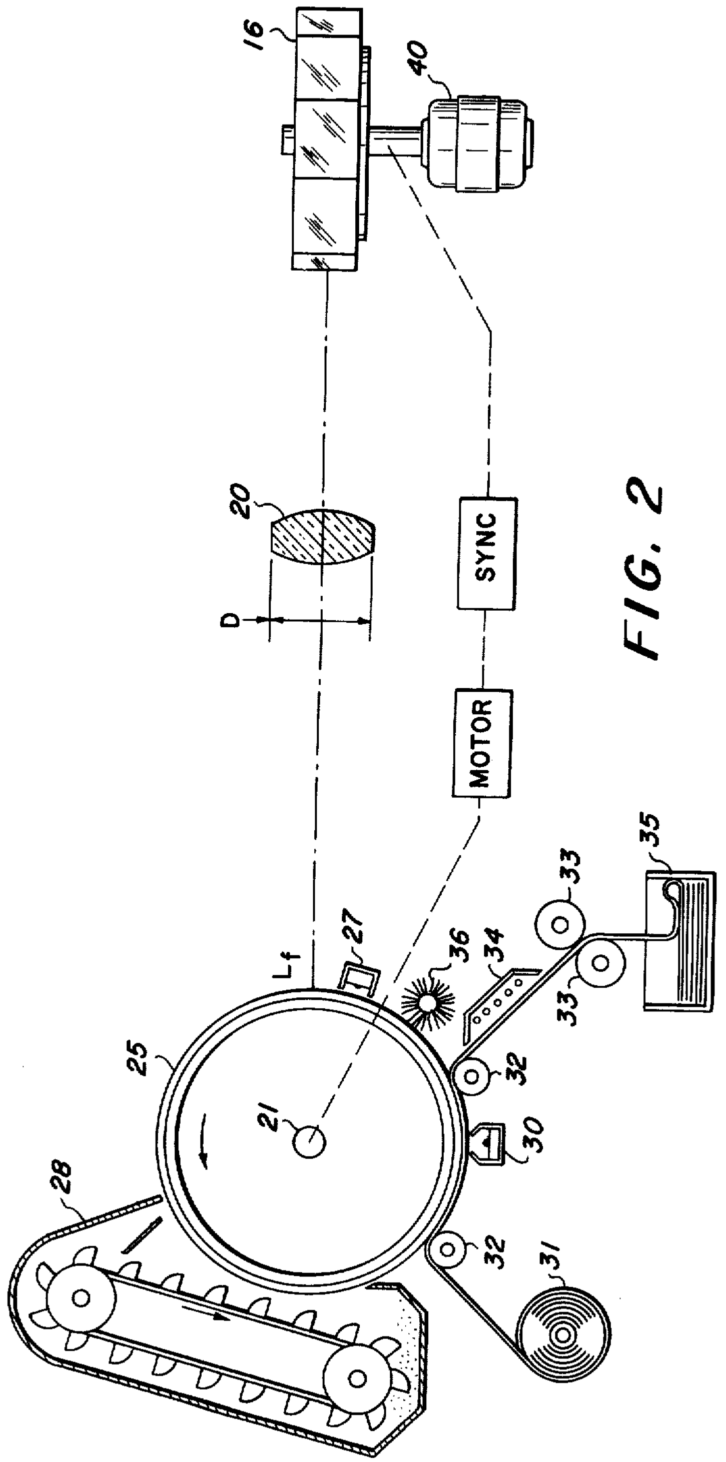
FIG. 2 is a perspective view of the utilization of the scanning beam and embodies additional features of the invention.

As shown in FIG. 2, medium 25 may be a xerographic drum which rotates consecutively through a charging station depicted by corona discharge device 27, exposure surface 26 where the beam from the rotating polygon 16 traverses the scan width *x* on the drum 25, through developing station 28 depicted by a cascade developing enclosure, transfer station 30 where a web of copy paper is passed in contact with the drum 25 and receives an electrostatic discharge to induce a transfer of the developed image from the drum 25 to the copy paper. The copy paper is supplied from the supply reel 31, passes around guide rollers 32 and through drive rollers 33 into receiving bin 35. A fusing device 34 fixes the images to the copy paper as it passes to bin 35.

Usable images are provided in that the information content of the scanning spot is represented by the modulated or variant intensity of light respect to its position within the scan width *x*. As the spot traverses the charged surface 26 through a given scan angle $\alpha$, the spot dissipates the electrostatic charge in accordance with its light intensity. The electrostatic charge pattern thus produced is developed in the developing station 28 and then transferred to the final copy paper. The xerographic drum 25 is cleaned by some cleaning device such as a rotating brush 36 before being recharged by charging device 27. In this manner, the information content of the scanned spot is recorded on a more permanent and useful medium. Of course, alternative prior art techniques may be employed to cooperate with a scanned spot in order to utilize the information contained therein.

The polygon 16 is continuously driven by a motor 40 and synchronized in rotation to a synchronization signal representative of the scan rate used to obtain the original video signal. The rotation rate of the xerographic drum 25 determines the spacing of the scan lines. It also may be preferable to synchronize the drum 25 in some manner to the signal source to maintain image linearity. The source image is reproduced in accordance with the signal and is transferred to printout paper for use or storage.

The scan rate is provided by utilizing the unmodulated portion of light beam 2. The beam splitter 3 illuminates at least one of the facets of the polygon 16 at an angle of incidence different from that of the incident modulated beam. An optically sensitive detector 38 is aligned apart from the scan width *x* on the surface 26 of the medium 25. As shown in FIG. 1, the detector 38 is positioned so as to receive only the unmodulated beam during each scan cycle to determine the start/stop of each scan. With an unmodulated beam for purposes of synchronization, video blanking and other operations are avoided which would otherwise be introduced into the detector circuitry and produced undesirable effects.

Figure 3:
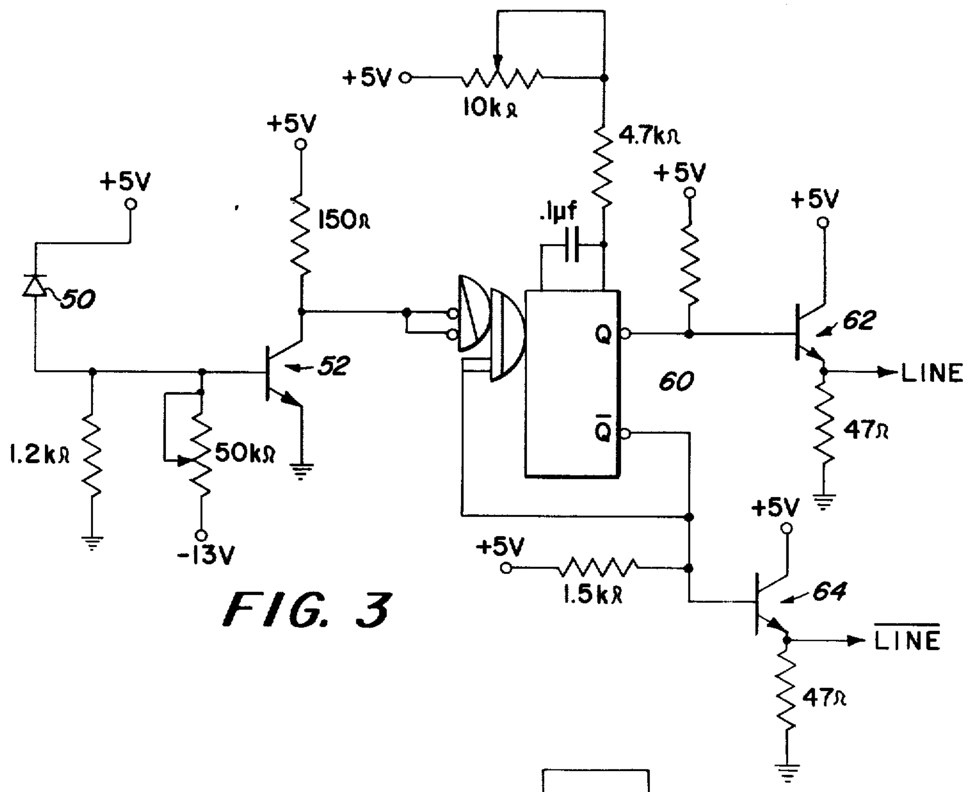
FIG. 3 is a circuit drawing of the start/stop of scan detector.

In FIG. 3 is shown the detector circuitry of the preferred embodiment. The light sensitive element of the detector 38 is a photo-transistor 50. The cathode of the transistor 50 is connected to the base of an amplifier/-discrimination transistor 52 and its anode is biased at +5 volts. The transistor 52 is biased slightly below its cutoff threshold by a variable resistor of 50 K ohms, connected between the base of transistor 52 and a potential of −13 volts, and a resistor of 1.2 K ohms connected between its base and ground. As the scan beam 2 illuminates the photo-transistor 50, transistor 50 conducts forcing the base of the transistor 52 from its negative potential through zero to a slightly positive value. Thus, when the transistor 50 is illuminated the transistor 52 goes from its cutoff threshold to saturation. The negative bias of the base of transistor 52, with its collector positively biased and its emitter connected to ground, provide edge discrimination and amplification of the response of the photo-transistor 50 to illumination by light.

The output from the collector of transistor 52 is connected to a monostable multivibrator 60 which is wired in a non-retriggerable mode as shown. The multivibrator 60 in this mode provides further edge discrimination. The multivibrator 60 is trimmed by a 4.7 K ohm resistor and a variable resistor of 10 K ohms connected in series to +5 volts and is timed out through a capacitor of 0.1 $\mu$f such that the pulse out of the multivibrator 60 is of a time $t$ equal to the duration of one scan transverse. The outputs Q and $\overline{Q}$ are connected to the common emitter line driving transistors 62 and 64 so as to provide a high current, low impedence output of opposite polarity on respective LINE and $\overline{\text{LINE}}$ outputs. Either the LINE or $\overline{\text{LINE}}$ output is used depending upon which polarity output is desired for synchronization.

With such edge discrimination as provided by the detector circuit, reliable synchronization of the start of scan can be made with the commencement of information flow by means of the video signal. This detection of the precise start of scan gives a precise definition of the gating pulse out which measures the length of characters of information to be recorded on the medium 25 in each scan line. The leading edge of the output of the detector circuit, then, is critical in aligning the sending of information in the form of a video signal to the start of each scan. At the end of the pulse, the end of each scan is indicated. With the start of the next scan, the multivibrator 60 is reset to provide another synchronization pulse.

Figure 4:
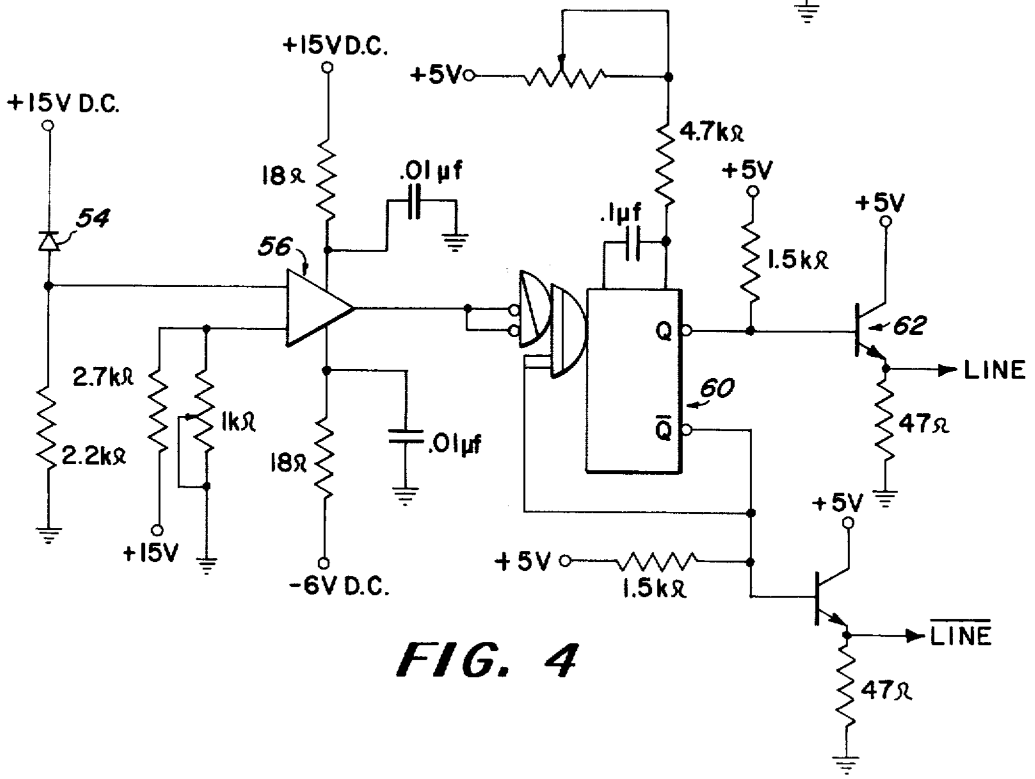
FIG. 4 is a circuit drawing of an alternate start/stop of scan detector which embodies features of the invention.

In FIG. 4 is shown another detector circuit. In this embodiment, the light sensitive element is a photodiode 54, which is operated in the photoconductive mode with a load resistance of 2.2 K ohms connected between its cathode and ground. The cathode of photodiode 54 is further connected to the positive input to a comparator 56, such as the differential amplifier circuit shown in FIG. 4. As the photo-diode is illuminated, a positive going pulse from 0 volts d.c. is generated for transmission to the comparator 56. The comparator 56 is adjusted to detect positive excursions from 0 volts and produce a sharp +5 volt to 0 volt pulse. The output of the comparator 56 is connected to the multivibrator and driving transistor arrangement of FIG. 3 in order to provide the necessary LINE and $\overline{\text{LINE}}$ outputs.

A specific synchronization scheme which could employ either of these detection circuits is taught in U.S. application Ser. No. 309,861, filed on Nov. 27, 1972 and assigned to the assignee of the present invention.

The number of facets in this preferred embodiment has been found to be optimum if at least 20 to 30 facets are employed. The scan angle $\alpha$ traversed would be equal to the number of facets chosen in relation to one complete revolution of the polygon 16. An extremely useful arrangement would have the polygon 16 with 24 facets and a scan angle $\alpha$ of 15°. Since the depth of focus requirement $d$ of the converging beam 22 is related to the scan angle $\alpha$ in that as the scan angle $\alpha$ increases the radius of curvature of the focal plane 24 increases, it is important to define a scan angle $\alpha$ in relation to the desired scan width $x$. For a scan width $x$ of approximately 11 inches it has been found that the scan angle $\alpha$ of 12 °to 18°, with 20 to 30 facets on the polygon 16, is optimum. FIG. 2($b$) is a top perspective view of the optical system shown in FIG. 2($a$).

The optical system of the present invention provides a virtually 100% duty cycle scan for the entire scan angle $\alpha$ by virtue of the illumination of at least two contiguous facets. The illumination of two contiguous facets is preferred. With such illumination, another scanning spot is provided at a distance equal to the scan width $x$ behind the leading scanning spot with virtually no wait between successive scans. With the continuous rotation of the polygon 16 additional contiguous facets are subsequently illuminated, thereby providing successive convergent beams following the leading convergent beam 22 by no more than the scan angle, if so desired. Thus, a flying spot scanning system which has an extremely high duty cycle is provided.

Obviously, many modifications of the present invention are possible in light of the above teaching. It is therefore to be understood that, in the scope of the appended claims, the invenetion may be practiced other than as specifically described.

What is claimed is:

1. Apparatus for recording information from an electrical signal onto a scanned medium comprising:

means for providing a beam of high intensity light, means for modulating the light beam in accordance with the transmission of information represented by an electrical signal, first optical means for expanding said modulated beam, second optical means in convolution with said first optical means for imaging said expanded, modulated beam to a spot in a focal plane coextensive with the surface of a light sensitive medium at a predetermined distance from said second optical means, scanning means positioned between said first and second means for scanning the spot across said medium, said scanning means having a reflective element, a portion of which is illuminated by said modulated beam to direct said spot to said medium, means positioned between said light beam providing means and said modulating means for splitting the unmodulated beam such that an unmodulated beam is directed at the illuminated portion of said scanning means, said scanning means further scanning a spot of unmodulated light throughout a scan width unassociated with said medium, and means for detecting and indicating the start of the scan of said spot of unmodulated light.

2. The apparatus as defined in claim 1 wherein said detecting means includes a timing element for timing the duration of the scan in order for said means to mark the end of transmission of the information.

3. The apparatus as defined in claim 2 wherein the start and end of scan indications synchronize said electrical signal to the movement of said spot across said medium.

4. The apparatus as defined in claim 3 wherein said detecting means further includes means for providing edge discrimination for indicating the precise instant of the start of scan.

5. The apparatus as defined in claim 4 wherein said scanning means includes a multifaceted polygon having reflective facets for reflecting said respective light beams incident upon it and means for rotating said polygon such that the respective reflected light beams are scanned through their respective scan paths.

6. The apparatus as defined in claim 5 wherein said light source is a laser which emits a beam of collimated light of substantially uniform intensity.

7. A flying spot scanning system for recording information from an electrical signal onto a scanned medium comprising:

means for providing a beam of high intensity light, means for modulating the light beam in accordance with the information content of an electrical signal represented by a stream of binary digits, means for focusing said modulated beam to a spot upon the surface of a light sensitive medium, scanning means positioned in the optical path of said modulated beam for scanning the spot across said medium, said scanning means having a reflective element, a portion of which is illuminated by said modulated beam to direct said spot to said medium, means positioned between said light beam providing means and said modulating means for splitting the unmodulated beam such that an unmodulated beam is directed at the illuminated portion of said scanning means, said scanning means further scanning a spot of unmodulated light throughout a scan width unassociated with said medium, and means for detecting and indicating the start of the scan of said spot of unmodulated light.

8. The system as defined in claim 7 wherein said detecting means includes a timing element for timing the duration of the scan in order for said means to mark the end of the stream of binary digits.

9. The apparatus as defined in claim 8 wherein the start and end of scan indications, respectively, are indications of the initiation of said stream of binary digits and its termination.

10. The apparatus as defined in claim 9 wherein said detecting means further includes means for discriminating the precise instant of the start of scan.

11. The system as defined in claim 10 wherein said scanning means includes a multifaceted polygon having reflective sides for reflecting said respective light beams incident to it and means for rotating said polygon such that the respective reflected light beams are scanned through their respective scan paths.

12. The system as defined in claim 11 wherein said light source is a laser which emits a beam of collimated light of substantially uniform intensity.

13. A flying spot scanning system for recording information from an electrical signal onto a scanned medium comprising:

means for providing a beam of high intensity light, means for modulating the light beam in accordance with the information content of the electrical signal, means for focusing said modulated beam to a spot upon the surface of a light sensitive medium, scanning means positioned in the optical path of said modulated beam for scanning the spot across said medium, said scanning means having a reflective element, a portion of which is illuminated by said modulated beam to direct said spot to said medium, means positioned between said light beam providing means and said modulating means for splitting said unmodulated beams such that an unmodulated beam is directed at the illuminated portion of said scanning means, said scanning means further scanning a spot of unmodulated light throughout a scan width unassociated with said medium, and means for detecting and indicating the start of the scan of said spot of unmodulated light.

14. The system as defined in claim 13 wherein said detecting means includes a timing element for timing the duration of the scan in order for said means to indicate the end of the scan.

15. The system as defined in claim 10 wherein the start and end of scan indications, respectively, are indications of the initiation of said electrical signal and its termination.

16. The system as defined in claim 15 wherein said detecting means further includes means for discriminating the precise instant of the start of scan.

17. The system as defined in claim 16 wherein the scanning means includes a multi-faceted polygon having reflective sides for reflecting the light incident to it and means for rotating said polygon such that the modulated light which illuminates certain of said sides is scanned in successive traces across said medium and the unmodulated light which further illuminates said illuminated sides is scanned in successive movements away from said detecting means.

18. The system as defined in claim 17 wherein said light source is a laser which emits a beam of collimated light of substantially uniform intensity.

* * * * *

UNITED STATES PATENT AND TRADEMARK OFFICE

CERTIFICATE OF CORRECTION

PATENT NO. : 3,922,485

DATED : November 25, 1975

INVENTOR(S) : Gary K. Starkweather et al

It is certified that error appears in the above-identified patent and that said Letters Patent are hereby corrected as shown below:

In column 8, line 40, delte "10" and insert -- 14 -- therefor.

Signed and Sealed this

*sixteenth* Day of *March 1976*

[SEAL]

*Attest:*

RUTH C. MASON
*Attesting Officer*

C. MARSHALL DANN
*Commissioner of Patents and Trademarks*